US008300056B2

(12) United States Patent
Nugent et al.

(10) Patent No.: US 8,300,056 B2
(45) **Date of Patent: *Oct. 30, 2012**

(54) SEAMLESS DISPLAY MIGRATION

(75) Inventors: Mike Nugent, Monte Sereno, CA (US); Thomas Costa, San Francisco, CA (US); Eve Brasfield, San Jose, CA (US); David Redman, Fremont, CA (US); Amanda Rainer, Sunnyvale, CA (US); Tim Millet, Mountain View, CA (US); Geoff Stahl, San Jose, CA (US); Adrian Sheppard, San Jose, CA (US); Ian Hendry, San Jose, CA (US); Ingrid Aligaen, Colorado Springs, CO (US); Kenneth C. Dyke, Sunnyvale, CA (US); Chris Niederauer, San Francisco, CA (US); Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/250,502

(22) Filed: Oct. 13, 2008

(65) Prior Publication Data

US 2010/0091025 A1 Apr. 15, 2010

(51) Int. Cl.
*G06F 15/16* (2006.01)
*G06F 15/80* (2006.01)

(52) U.S. Cl. .......................... 345/503; 345/502; 345/505

(58) Field of Classification Search .......... 345/501–503, 345/505

See application file for complete search history.

(56) References Cited

U.S. PATENT DOCUMENTS

| | | | | | |
|---|---|---|---|---|---|
| 5,963,200 | A * | 10/1999 | Deering et al. | ............... | 345/213 |
| 5,969,728 | A | 10/1999 | Dye et al. | | |
| 6,943,844 | B2 * | 9/2005 | Cahill, III | ..................... | 348/537 |
| 7,119,808 | B2 * | 10/2006 | Gonzalez et al. | ............. | 345/502 |
| 7,382,333 | B2 | 6/2008 | Chen et al. | | |
| 2002/0163523 | A1 | 11/2002 | Adachi | | |
| 2005/0030306 | A1 | 2/2005 | Lan et al. | | |
| 2006/0146057 | A1 * | 7/2006 | Blythe | .......................... | 345/506 |

(Continued)

FOREIGN PATENT DOCUMENTS

EP 0482678 A2 4/1992

OTHER PUBLICATIONS

Mann, Justin "Nvidia prepares hybrid SLI technology to save power," TechSpot.com, Jun. 25, 2007, downloaded from http://www.techspot.com/news/25854-nvidia-prepares-hybrid-sli-technology-to-save-power.html, Jun. 29, 2009, 3 pages.

(Continued)

*Primary Examiner* — Joni Hsu

(74) *Attorney, Agent, or Firm* — Wong, Cabello, Lutsch, Rutherford & Brucculeri, L.L.P.

(57) ABSTRACT

Exemplary embodiments of methods, apparatuses, and systems for seamlessly migrating a user visible display stream sent to a display device from one rendered display stream to another rendered display stream are described. For one embodiment, mirror video display streams are received from both a first graphics processing unit (GPU) and a second GPU, and the video display stream sent to a display device is switched from the video display stream from the first GPU to the video display stream from the second GPU, wherein the switching occurs during a blanking interval for the first GPU that overlaps with a blanking interval for the second GPU.

6 Claims, 7 Drawing Sheets

U.S. PATENT DOCUMENTS

| | | | | |
|---|---|---|---|---|
| 2007/0094444 | A1 | 4/2007 | Sutardja | |
| 2007/0139422 | A1 * | 6/2007 | Kong et al. | 345/502 |
| 2007/0279407 | A1 | 12/2007 | Vasquez | |
| 2008/0030509 | A1 | 2/2008 | Conroy et al. | |
| 2008/0034238 | A1 | 2/2008 | Hendry et al. | |
| 2008/0117222 | A1 | 5/2008 | Leroy et al. | |
| 2009/0079746 | A1 | 3/2009 | Howard et al. | |

OTHER PUBLICATIONS

NVIDIA Hybrid SLI Technology, Technology Overview, Apr. 2008, v01, 2 pages.

NVIDIA User Guide, Introducing Hybrid SLI Technology, User Guide, May 2008, DS-03957-001_v01, 21 pages.

* cited by examiner

SEAMLESS DISPLAY MIGRATION

FIELD

The various embodiments described herein relate to apparatuses, systems, and methods for seamlessly migrating a user visible display stream from one rendered display stream to another rendered display stream.

BACKGROUND

A graphics processing unit (GPU) is typically a dedicated graphics rendering device for a personal computer, workstation, game console, mobile computing device, such as a smart phone, PDA, or other hand-held computing device, or other video hardware. A GPU can be integrated directly into the motherboard of the device or the GPU can reside within an individual video card coupled to said motherboard, as an external GPU. Many computers have integrated GPUs, which can be less powerful than their add-in counterparts, external GPUs. A user seeking high performance graphics, for example, for a video game, will often add an external GPU to a system with an existing, integrated GPU. Additionally, processing units such as central processing units (CPUs) or cores of a multi-core CPU can be enabled to render graphics.

Adding an external GPU may override the functionality of an integrated GPU. Alternatively, two or more GPUs can share the workload of rendering an image for a display: two identical graphics cards are coupled to a motherboard and set up in a master-slave configuration. The two GPUs then split the workload by either dividing the content of the display or rendering alternate frames. In dividing the content of the display, the slave GPU may render a portion of the screen and transmit it to the master GPU. In the meantime, the master GPU renders the remaining portion of the screen and combines it with the rendered portion from the slave GPU before transmitting it to the display device.

As the processing power and the number of GPUs within a system has increased, so has the demand for electrical power. Many applications do not require the processing power of an external GPU. Additionally, a user may want to conserve power, for example, when operating a device on a battery, and be willing to sacrifice some GPU processing power in exchange for energy savings. In view of aforementioned, it is desirable to have an apparatus, system, or method to migrate a display from a first GPU to a second GPU and reduce the power drawn by the first GPU while it is not in use. It is further desirable to migrate the display seamlessly and without substantially interrupting the display stream to the display device.

SUMMARY OF THE DESCRIPTION

Exemplary embodiments of methods, apparatuses, and systems for seamlessly migrating a user visible display stream from one rendered display stream to another rendered display stream are described. For one embodiment, mirror video display streams are received from both a first graphics processing unit (GPU) and a second GPU, and the video display stream sent to a display device is switched from the video display stream from the first GPU to the video display stream from the second GPU, wherein the switching occurs during a blanking interval for the first GPU that overlaps with a blanking interval for the second GPU.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
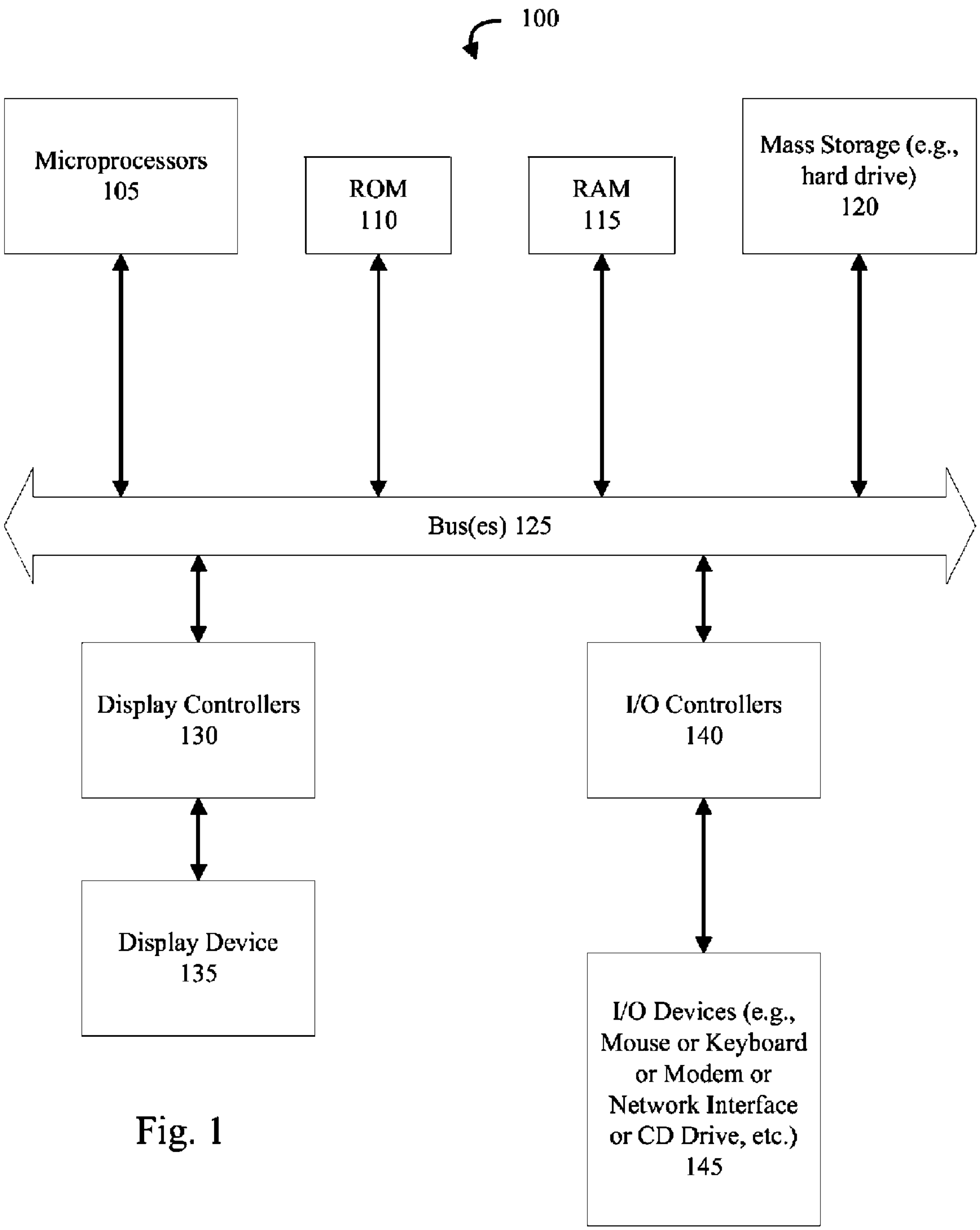
FIG. 1 illustrates an exemplary computer system that can perform seamless display migration according to an embodiment.

FIG. 1 illustrates an exemplary computer system 100, also known as a data processing system that can, for example, perform the seamless display migration described with reference to FIGS. 2-7. For one embodiment, the operations, processes, modules, methods, and systems described and shown in the accompanying figures of this disclosure are intended to operate on one or more exemplary computer systems 100 as sets of instructions (e.g., software), also known as computer implemented methods. The exemplary computer system 100 is generally representative of personal or client computers, mobile devices, (e.g., mobile cellular device, PDA, satellite phone, mobile VoIP device), and servers. A mobile device will often also have an antenna and a microchip, for running a protocol for the radio frequency reception and transmission of communications signals. The exemplary computer system 100 includes at least processor 105 (e.g., a Central Processing Unit (CPU), a Graphics Processing Unit (GPU), a core of a multi-core processor, or a combination thereof), a Read Only Memory (ROM) 110, a Random Access Memory (RAM) 115, and a Mass Storage 120 (e.g., a hard drive) which communicate with each other via a bus or buses 125.

The exemplary computer system 100 further includes a Display Controller 130, in which an embodiment may be implemented. Display Controller 130 may include one or more GPUs as well as a means for switching between them and means for creating a composite of their individual video streams. Alternatively, the display controller 130 may work cooperatively with various other components in computer system 100 to implement an embodiment.

The computer system 100 also includes a Display Device 135 (e.g., Liquid Crystal Display (LCD) or a Cathode Ray Tube (CRT) or a touch screen, plasma display, light-emitting diode (LED), organic light-emitting diode (OLED), etc.), an I/O Controller 140, and an I/O Devices 145 (e.g., mouse, keyboard, modem, network interface, CD drive, etc.) The network interface device may be wireless in case of a mobile device, for communicating to a wireless network (e.g. cellular, Wi-Fi, etc.). A mobile device may include one or more signal input devices (e.g. a microphone, camera, fingerprint scanner, etc.) which are not shown.

The storage unit 120 includes a machine-readable storage medium on which is stored one or more sets of instructions (e.g. software) embodying any one or more methodologies or functions. The software may also reside, completely or at least partially, within the RAM 115 or ROM 110 and/or within the processor 105 during execution thereof by the computer system 100, the RAM 115, ROM 110 and within the processor 105 also constituting machine-readable storage media. The software may further be transmitted or received over a network (not shown) via a network interface device 140.

Figure 2:
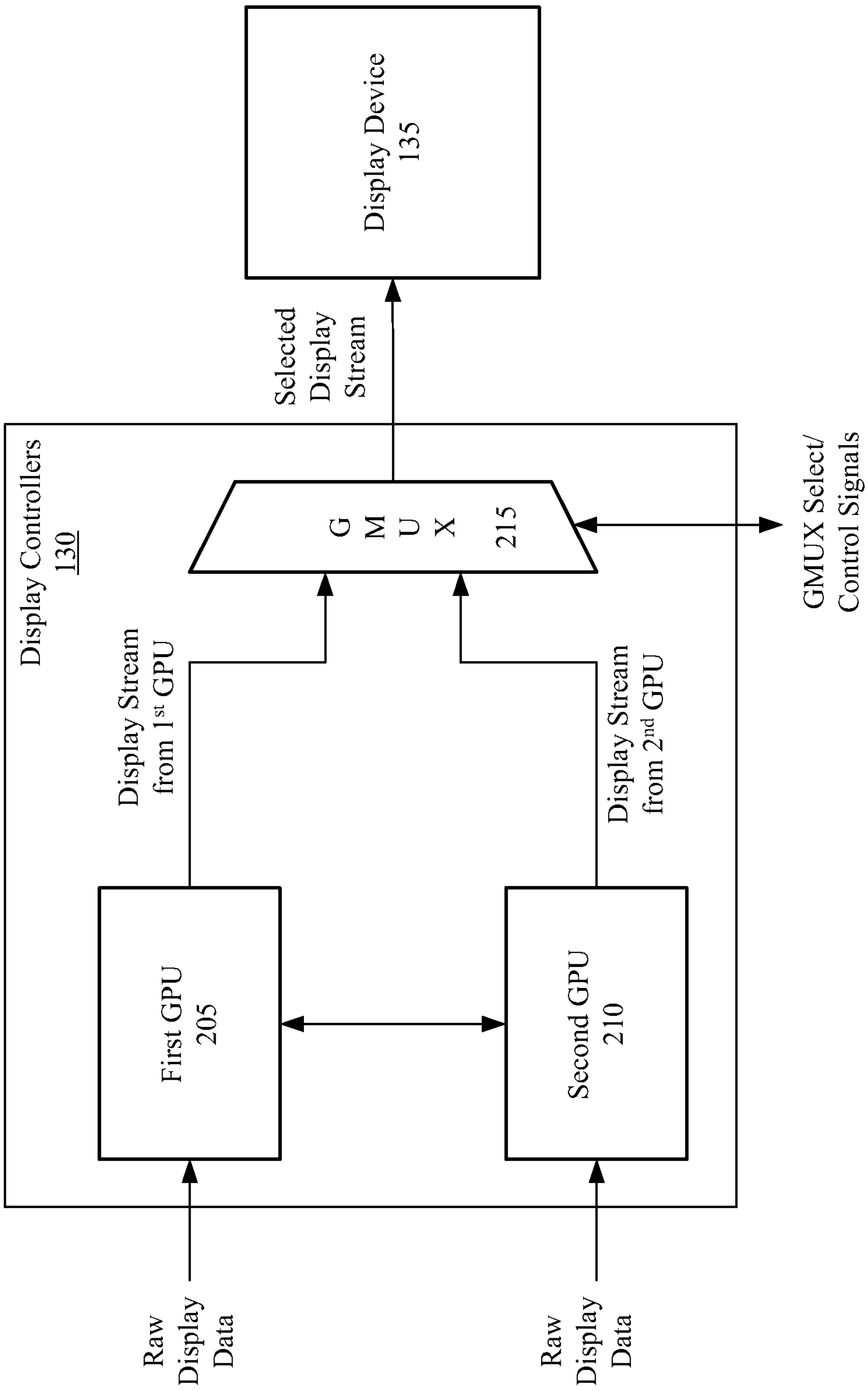
FIG. 2 illustrates an exemplary display controller as illustrated in FIG. 1, including a first and a second graphics processing unit (GPU) and a graphics multiplexer (GMUX) for seamlessly migrating the display stream from one GPU to the other GPU, according to an embodiment.

FIG. 2 illustrates an exemplary display controller 130 including a first GPU 205 and a second GPU 210 and a graphics multiplexer (GMUX) 215 for seamlessly changing the display stream to a display device 135 from one GPU to the other GPU. For one embodiment, the first GPU 205 and second GPU 210 are different GPUs with different capabilities, e.g., an integrated GPU and an external GPU. Reference to GPU's throughout this description may include dedicated Graphics Processing Units, Central Processing Units, one or more cores of a multi-core processing unit, or other processing units or controllers known in the art that are enabled to render display streams. For simplicity, the remainder of the description will refer to units that render display streams collectively as a GPUs.

For one embodiment, microprocessor (CPU) 105, in cooperation with software applications, sends raw display data to the active, first GPU 205. The first GPU 205 renders a display stream, which is passed to GMUX 215. GMUX 215 receives select and control signals that indicate that the first GPU 205 is active and passes the output from the first GPU 205 to the display device 135. The select and control signals may originate from a driver in software or firmware, a windows server, the CPU 105, other controller within computer system 100, or a combination thereof. For one embodiment, the first GPU 205 and the second GPU 210 display streams are low-voltage differential signaling (LVDS) display streams.

During operation, CPU 105 may make the determination to switch from the first GPU 205 to the second GPU 210. This determination may be the result of a change in the electrical power source—e.g., a laptop has been unplugged and is now running on battery power or other predetermined power setting. Alternatively, the determination may be the result of a user input, e.g., a software switch. In yet another embodiment, the determination is the result of recognizing a software application as incompatible with, optimally executed with, or efficiently operated with a specific GPU. For example, the launching of a particular application may initiate a GPU switch. The determination may be the result of a request to use the active GPU for another purpose. For one embodiment, a switch is initiated as a result of the combination of one or more of the determinations described above or other known techniques. Alternatively, the recognition of an active program that is incompatible with the second GPU 210 or incompatible with switching in general may act to counter one of the above determinations to switch or delay the switch until the incompatible program terminates.

For one embodiment, once the determination to migrate from the first GPU 205 to the second GPU 210 has been made, the raw display data fed into the first GPU 205 is mirrored to the second GPU 210. For one embodiment, the CPU 105, a controller, operating system software, or a combination thereof creates the mirrored raw display data. The first GPU 205 and second GPU 210 both render display streams based on the mirrored raw display data within computer system 100, but only the output from one GPU, e.g., the first GPU 205, is sent to the display device 135 via the GMUX 215. For one embodiment, the output generated by each the first GPU 205 and the second GPU 210 contains not only application display data, but all of the display data, including, but not limited to, backlight data, output enable, etc.

For one embodiment, the GMUX 215 receives a control signal that both display streams are active and waits for an overlapping blanking interval to switch the output to the display device 135 from the output of the first GPU 205 to the output of the second GPU 210. Embodiments of switching during this blanking interval are described in detail below with reference to FIGS. 3-7.

For one embodiment, the first GPU 205 is communicably coupled to the second GPU 210. The first GPU 205 and the second GPU 210 may share the workload of rendering an image for a display. For one embodiment, the two GPUs act cooperatively in a master-slave relationship and the slave GPU forwards a rendered portion of a display stream to the master GPU. The master GPU renders the remainder of the display stream and combines it with the slave GPU's rendered portion and sends the composite output to the Display Device 135.

Figure 3:
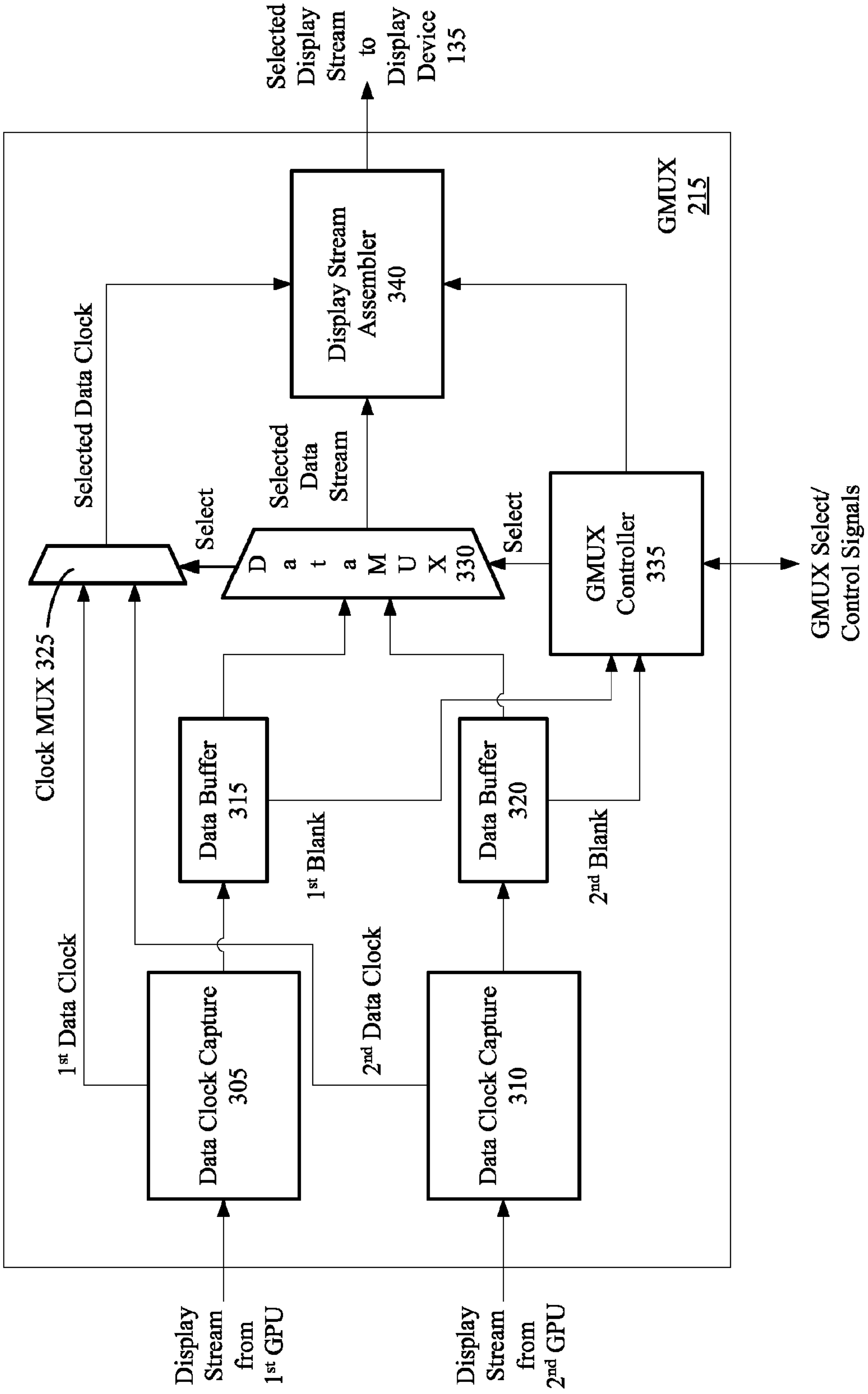
FIG. 3 illustrates an exemplary GMUX as illustrated in FIG. 2 according to an embodiment.

FIG. 3 illustrates an exemplary GMUX 215 from FIG. 2. For one embodiment, display streams from the first GPU 205 and the second GPU 210 are inputted into respective Data Clock Capture blocks 305 and 310. Data Clock Capture blocks 305 and 310 extract the video timing signals from the GPU display streams so the GMUX 215 can synchronize the switch between GPUs. The first data clock and second data clock are separated and sent to the Clock MUX (multiplexer) 325.

For one embodiment, Clock MUX 325 is a multiplexer that receives a select signal to determine which data clock is passed on to the display device 135. Alternatively, other types of selection circuits may be used that can be configured to select one of the data clocks. For one embodiment, the GMUX Controller 335 provides the select signal to Clock MUX 325 to coordinate the selected data clock with the selected data stream. Alternatively, the select signal is generated by a driver, the CPU 105, another controller, or other technique known in the art.

The display streams, with the data clocks separated, are inputted into Data Buffer 315 and Data Buffer 320 respectively. For one embodiment, blanking intervals of the two display streams are compared in Data Buffer 315 and Data Buffer 320. For an alternative embodiment, the GMUX Controller 335 receives each blanking interval for the first and second data streams. In comparing blanking intervals, the GMUX Controller 335 determines how much overlap, if any, exists between the two display streams. For one embodiment, the overlap is measured by an amount of display line periods during the overlap of the blanking intervals. The GMUX Controller 335 determines that a switch can be made when a predetermined amount of display line periods exist during the overlap of the blanking intervals. For one embodiment, the blanking interval is a vertical blanking interval. For an alternative embodiment, the blanking interval is a horizontal blanking interval. In other embodiments, the blanking interval may be either a vertical or a horizontal blanking interval. If the GMUX Controller 335 determines that the data display streams have blanking intervals with a sufficient amount of overlap, the GMUX Controller 335 sends the select signals to the Clock Mux 325 and the Data Mux 330 to migrate the display stream data sent to the Display Device 135 during the overlap of the blanking intervals.

The Display Device 135 displays no data from a selected display stream during a blanking interval. The refresh rate is the number of times in a second that display hardware draws the data it receives. If, for example, the Display Device 135 has a slow refresh rate, a blanking interval could be visible as a screen flicker. In contrast, for one embodiment, the refresh rate for the Display Device 135 draws the display stream a number of times per second such that the blanking interval is practically imperceptible to the user—e.g., 60 Hz. Therefore, a migration from one GPU to another completed during a blanking interval may be executed without interruption to the visible display stream.

Once the overlapping blanking interval has ended and the migration has been completed, the display stream from the second GPU 210 may use the mirrored display to seamlessly continue the display stream from the first GPU 205. For one embodiment, GMUX Controller 335 sends a control signal to the processor, operating system, firmware controller, GPUs, or other hardware or software controller for the GPUs to indicate a successful switch. The mirrored raw display data sent to the first GPU 205 may then be terminated and the power drawn by the first GPU 205 may be reduced. For one embodiment, the first GPU 205 may be completely powered down.

For one embodiment, the process of migrating from the first GPU 205 to the second GPU 210 begins during a selected blanking interval, for the first GPU 205, after the second GPU 210 begins rendering the mirrored display data. For one embodiment, the selected blanking interval is the first blanking interval for the first GPU 205 once the second GPU 210 has begun rendering the mirrored display data. If the blanking intervals for the first GPU 205 and the second GPU 210 are not overlapping during the selected blanking interval, the output of the GMUX 215 is held at the completion of the last frame from the first GPU 205, i.e. within the selected blanking interval, until the second GPU 210 enters a blanking interval. For one embodiment, the display stream from the first GPU 205 is held in a blanking interval by decoupling the output of GMUX 215 from the next frame of the output of the first GPU 205 and holding the Display Stream Assembler 340 within the selected blanking interval for a length of time longer than the selected blanking interval as received. For one embodiment, the GMUX Controller 335 sends control signals to the Display Stream Assembler 340 to hold the outputted display stream sent to a display device 135 within the selected blanking interval. For one embodiment, a switch from the output of the first GPU 205 to the second GPU 210 is made during the selected blanking interval for the first GPU 205, once the output of GMUX 215 is held. For an alternate embodiment, the switch is completed from the output of the first GPU to the output of the second GPU anytime between the selected blanking interval and when the second GPU 210 enters a blanking interval, once the output of GMUX 215 is held. Once the second GPU 210 has entered a blanking interval, the output of the GMUX 215 may be coupled to the output from the second GPU 210.

Depending on the display device and the amount of delay required to cause an overlap, the refresh of the display device will be delayed, potentially causing some fade in the displayed image—e.g., fade towards white or fade towards black. Nevertheless, the delay will be, at the longest, the length of time needed to output one frame. For example, a frame may be refreshed every 16 milliseconds, therefore the longest delay would be 16 milliseconds. Therefore, the switch will occur without substantial interruption to the visible display.

For one embodiment, a substantial interruption to the visible display stream results from a loss of the lock of the display's phase-locked-loop (PLL) causing the Display Device 135 to go blank until the PLL relocks. Alternatively, a substantial interruption to the visible display stream results from frame tearing, in which both the display stream from the first GPU 205 and the display stream from the second GPU 210 are sent to the Display Device 135 without coordinating a composite display stream. Further interruptions to the visible display stream may be degraded quality of the display image and other artifacts known in the art.

For an alternate embodiment, a switch between GPUs is executed without any interruption to the visible display stream, including any potential fading of the display image. If the GPUs experience an overlapping blanking interval within a predetermined amount of time, a switch between outputs of the GPUs is executed without interruption or need for manipulation of either GPU. Alternatively, if the clocks of the first GPU 205 and the second GPU 210 operate at similar rates (but not identical and synchronized rates), an overlapping blanking interval may take more than the predetermined amount of time to occur. For one embodiment, if the GMUX Controller 335 does not encounter overlapping blanking intervals within the predetermined amount of time, the GMUX Controller 335 sends a signal to change the clock rate of the second GPU 210. The mirrored raw display data sent to the second GPU 210 is temporarily terminated, the clock of second GPU 210 is reset to a new rate, the raw display data is mirrored to the second GPU 210 again, and the GMUX Controller 335 resumes comparing the two blanking intervals in search of an overlap prior to the expiration of the predetermined amount of time.

At the time a GPU migration is requested, computer system 100 may be running a program incompatible with the second GPU 210 and a simple migration to the second GPU 210 cannot be completed without terminating the incompatible program. Applications may be aware of the fact that there is an active GPU and one or more inactive GPUs. Furthermore, applications may communicate with the system 100 to advertise their compatibility with various GPUs. Those applications that are compatible with switching to the second GPU 210 are aware of the capabilities of and corresponding settings for the second GPU 210 and, therefore, can be prepared to seamlessly switch while active. For example, an application will not need to create a new display context from scratch when a switch is made between GPUs. This may impact the determination of variables such as drawing color, the viewing and projection transformations, lighting characteristics, material properties, etc. On the other hand, if an application is not compatible with switching to the second GPU 210, the operating system, a driver, the CPU 105, another controller, or other technique known in the art shields the application from the existence of any GPU within the system with which it is not compatible. For example, an application that is compatible with the first GPU 205 but incompatible with the second GPU 210 will only be aware of the first GPU 205.

For one embodiment, a determination that active programs are compatible with the second GPU 210 and compatible with making the switch is required prior to powering up the second GPU 210 and initiating the switch. Alternatively, the switch may proceed despite an active, incompatible program. For one embodiment, the first GPU will send a rendered display stream for the incompatible program directly to the second GPU, while continuing to send a complete display stream to GMUX 215. Although the second GPU is powered up and other raw display data is mirrored to both GPUs, the incompatible program continues to operate as if the first GPU 205 is the only rendering entity. The second GPU 210 will create a composite output from the rendered data from the first GPU 205 combined with the remainder of the display stream rendered by the second GPU 210. The second GPU 210 will send the composite output to GMUX 215. As described above, the migration from first GPU 205 display stream to the second GPU 210 display stream occurs during an overlapping blanking interval. GMUX Controller 335 sends a control signal to the operating system, firmware controller, GPUs, or other controller for the GPUs to indicate a successful switch.

For one embodiment, after a successful switch, the mirrored raw display data sent to the first GPU 205 is terminated, but the raw display data for the incompatible program continues to be sent to the first GPU 205. Accordingly, the first GPU 205 may cease to send a complete display stream to GMUX 215 but remains active as the second GPU 210 is dependent upon the first GPU 205 to render display data for the incompatible program. Once the incompatible program has terminated, it is determined that the dependency upon the first GPU 205 has terminated. The power drawn by the first GPU 205 may then be reduced.

For an alternate embodiment, if the dependency upon the first GPU 205 has not terminated, the system may switch back to only the first GPU 205 similar to the switch described above. For one embodiment, the determination to switch back to the first GPU 205 occurs in response to the expiration of a predetermined amount of time following the switch to the second GPU 210. For example, if the switch was initially made to conserve power, an extended period of running both GPUs may consume more power than just continuing to run the higher power processor alone.

For one embodiment, Data MUX 330 is a multiplexer that receives a select signal to determine which data display stream is passed on to the display device 135. Alternatively, other types of selection circuits may be used that can be configured to select one of the data display streams. For one embodiment, the GMUX Controller 335 provides the select signal to Clock MUX 325 to coordinate the selected data clock with the selected data stream. Alternatively, the select signal is generated by a driver, the CPU 105, another controller, or other technique known in the art.

For one embodiment, Display Stream Assembler 340 receives the selected data clock and the selected data stream, assembles them into a single display stream, and sends the selected display stream to the Display Device 135. For an alternative embodiment, the selected data clock and the selected data stream are not combined, but are sent to the Display Device 135 separately.

Figure 4:
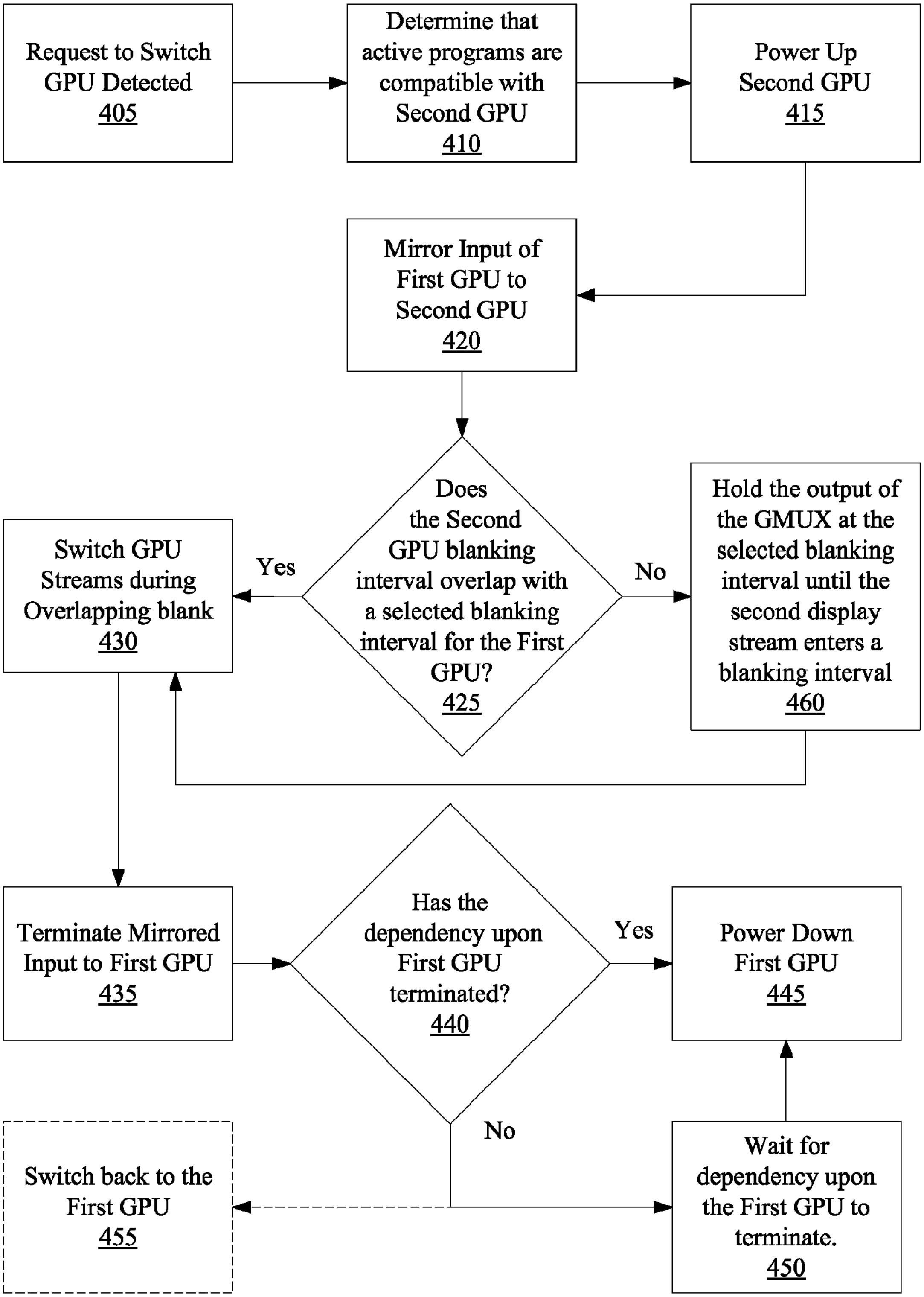
FIG. 4 is a flow chart that illustrates an exemplary method of display migration according to an embodiment.

FIG. 4 is a flow chart that illustrates an exemplary method of display migration as described with reference to FIGS. 1-3. A request to migrate the Display Device 135 from the first GPU 205 to the second GPU 210 is detected at block 405. For one embodiment, the method may require that all active programs be compatible with switching to the second GPU 210 at block 410. If not all active programs are compatible with switching to the second GPU 210, then the method will not continue until the incompatible program(s) have terminated. Alternatively, the method may skip block 410. The second GPU 210 is powered up at block 415. Raw display data is mirrored and sent to the second GPU 210 at block 420. If a program is running that is incompatible the second GPU 210, the first GPU 205 sends rendered display data for the incompatible program to the second GPU 210 at block 420. At block 425, once both GPUs are outputting rendered display streams, it is determined if the two display streams have an overlapping blanking interval during a selected blanking interval for the first GPU 205 that is sufficient to migrate the display streams. For one embodiment, the selected blanking interval is the first blanking interval for the first GPU 205 once the second GPU 210 has begun rendering the mirrored display data.

If a sufficient overlapping blanking interval occurs, the selected display stream is switched during the overlapping blanking interval at block 430. Upon a successful switch, the raw data feed to the first GPU 205 is terminated at block 435. If a program that is incompatible with the second GPU 210 is running, the raw data feed related to the incompatible program continues to the first GPU 205, despite the termination of the mirror. At block 440, the method determines if the dependency upon the first GPU 205 remains due to an incompatible program. If no incompatible program is running, the power drawn by the first GPU 205 is reduced at block 445.

For one embodiment, if an incompatible program is running and therefore the dependency upon the first GPU 205 has not terminated, the method waits for the program to terminate, at block 450, prior to reducing the power to the first GPU 205 at block 445. In an alternative embodiment, the method optionally switches back to the first GPU 205 if the dependency upon the first GPU 205 has not terminated at block 455. For one embodiment, the method may wait for the expiration of a predetermined amount of time after the successful switch to determine that the dependency upon the first GPU 205 has not terminated and to switch back to the first GPU 205.

If a sufficient overlapping blanking interval does not occur within the selected blanking interval for the first GPU 205, output of GMUX 215 is held in the selected blanking interval for the first GPU 205 until the second GPU enters a blanking interval at block 450. The selected display stream is then switched during the overlap of the selected blanking interval and the blanking interval for the second GPU 205 at block 430 and the flow continues as described above.

Figure 5:
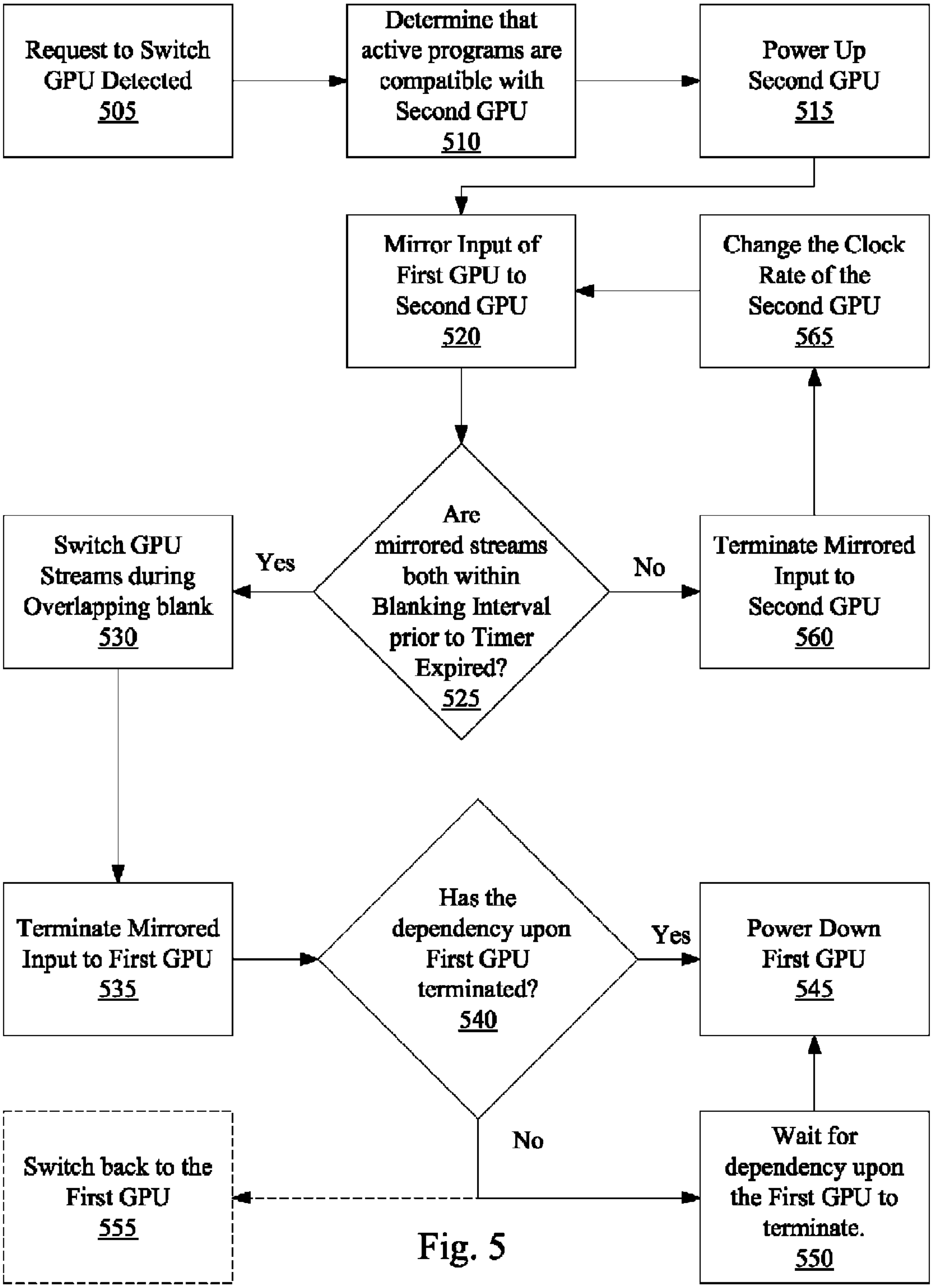
FIG. 5 is a flow chart that illustrates an exemplary method of display migration according to an alternate embodiment.

FIG. 5 is a flow chart that illustrates an alternate exemplary method of display migration as described with reference to FIGS. 1-3. A request to migrate the Display Device 135 from the first GPU 205 to the second GPU 210 is detected at block 505. For one embodiment, the method may require that all active programs be compatible with switching to the second GPU 210 at block 510. If not all active programs are compatible with switching to the second GPU 210, then the method will not continue until the incompatible program(s) have terminated. Alternatively, the method may skip block 510. The second GPU 210 is powered up at block 515. Raw display data is mirrored and sent to the second GPU 210 at block 520. If a program is running that is incompatible the second GPU 210, the first GPU 205 sends rendered display data for the incompatible program to the second GPU 210. Once both GPUs are outputting rendered display streams, it is determined if the two display streams have an overlapping blanking interval sufficient to migrate the display streams prior to the expiration of a predetermined amount of time at block 525.

If a sufficient overlapping blanking interval occurs, the selected display stream is switched during the overlapping blanking interval at block 530. Upon a successful switch, the raw data feed to the first GPU 205 is terminated at block 535. If a program that is incompatible with the second GPU 210 is running, the raw data feed related to the incompatible program continues to the first GPU 205, despite the termination of the mirror. At block 540, the method determines if the dependency upon the first GPU 205 remains due to an incompatible program. If no incompatible program is running, the power drawn by the first GPU 205 is reduced at block 545.

For one embodiment, if an incompatible program is running and therefore the dependency upon the first GPU 205 has not terminated, the method waits for the program to terminate, at block 550, prior to reducing the power to the first GPU 205 at block 545. In an alternative embodiment, the method optionally switches back to the first GPU 205 if the dependency upon the first GPU 205 has not terminated at block 555. For one embodiment, the method may wait for the expiration of a predetermined amount of time after the successful switch to determine that the dependency upon the first GPU 205 has not terminated and to switch back to the first GPU 205.

If a sufficient overlapping blanking interval does not occur within the predetermined amount of time, the raw data feed to the second GPU 210 is terminated at block 550. The clock rate of the second GPU 210 is changed at block 555 and the method resumes at block 520.

Figure 6:
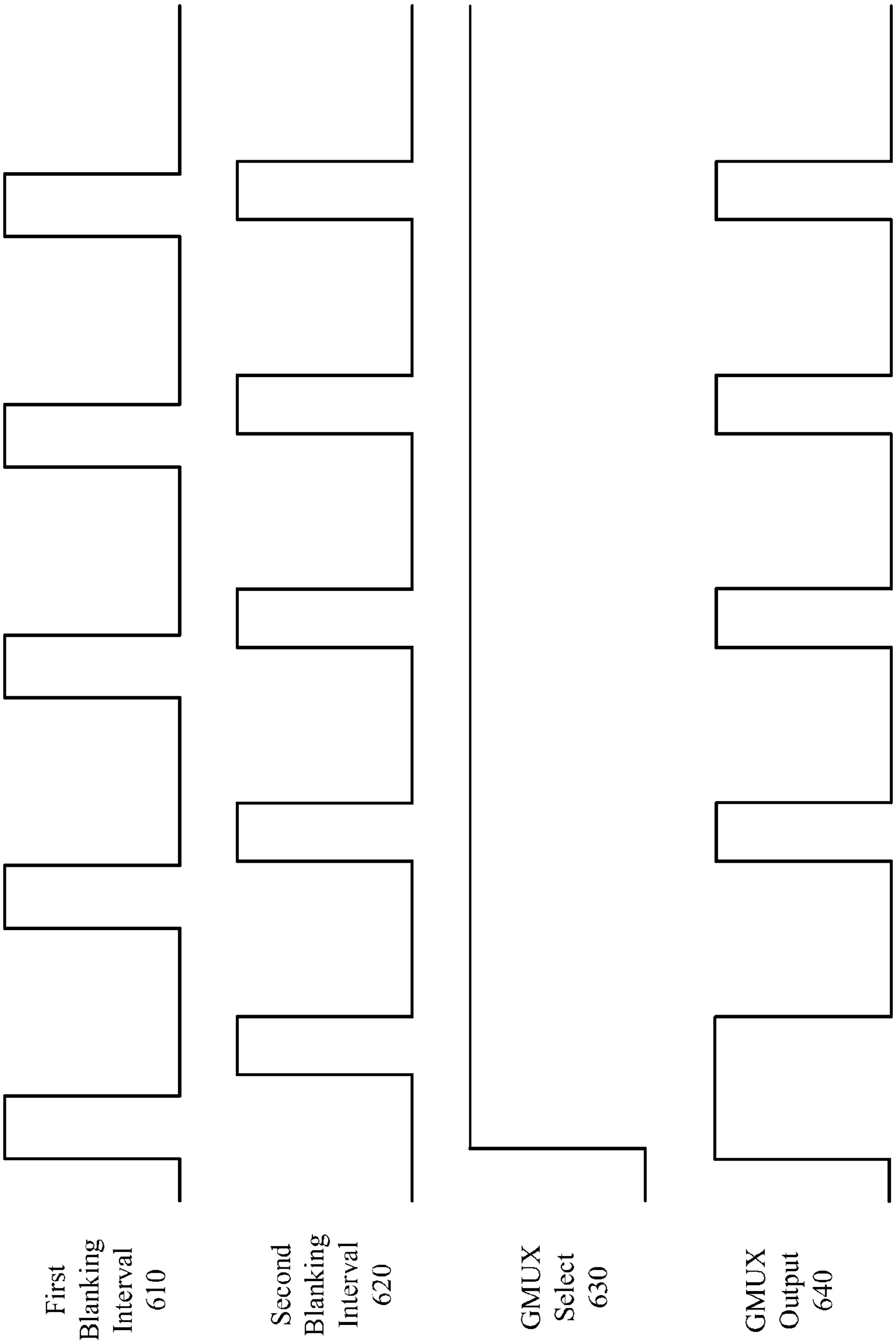
FIG. 6 is an exemplary timing diagram showing signals involved with and affected by a switch between the first GPU and the second GPU according to an embodiment.

FIG. 6 is an exemplary timing diagram showing signals involved with and affected by a switch between the first GPU and the second GPU according to an embodiment. FIG. 6 shows a comparison of the first blanking interval 610 and the second blanking interval 620, and a GMUX Select signal 630 to switch between the first GPU 205 and the second GPU 210. The GMUX output 640 reflects an output related to the first blanking interval 610 until a switch is completed and then it reflects an output related to the second blanking interval 620. In this example, the selected blanking interval is the first occurrence of a blanking interval for the first GPU 205, after both GPU's are rendering mirrored display streams. The GMUX output 640 is held within this blanking interval until the second GPU 210 enters its next blanking interval. For one embodiment, the determination of the state of blanking intervals occurs within the GMUX Controller 335. The GMUX Select 630 may change, e.g., from a logical zero to a logical one, to switch the display stream from the first GPU 205 to the second GPU 210, anytime within the hold of the GMUX output 640 and the blanking interval for the second GPU 210. For one embodiment, the GMUX Select 730 is sent to both the Data MUX 330 and Clock MUX 325 to switch separate data and clock streams.

Figure 7:
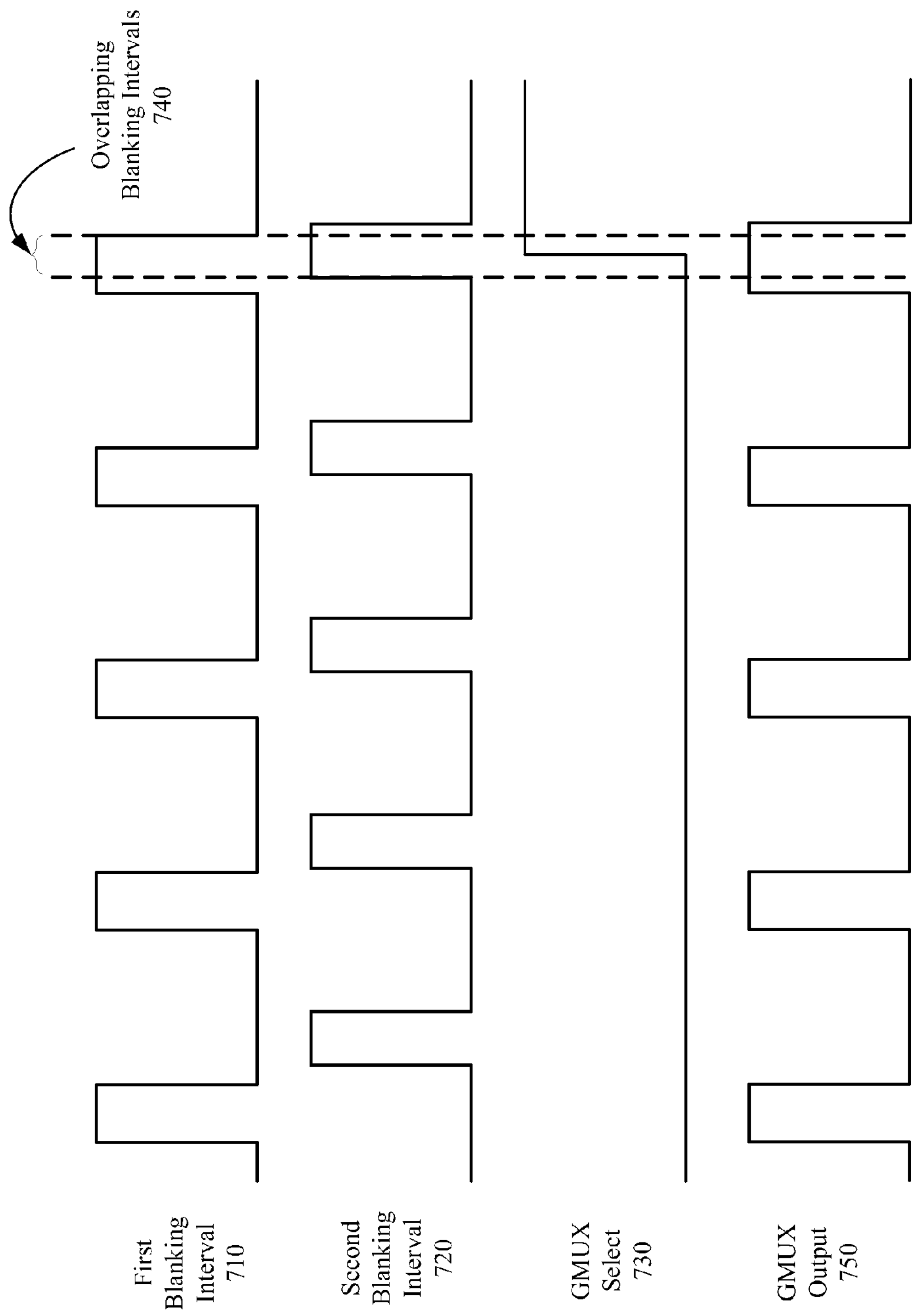
FIG. 7 is an exemplary timing diagram showing signals involved with and affected by a switch between the first GPU and the second GPU according to an alternate embodiment

FIG. 7 is an exemplary timing diagram showing signals involved with and affected by a switch between the first GPU and the second GPU according to an alternate embodiment. FIG. 7 shows a comparison of the first blanking interval 710 and the second blanking interval 720, and a GMUX Select signal 730 to switch between the first GPU 205 and the second GPU 210 during the overlap of the blanking intervals 740. For one embodiment, the comparison of blanking intervals occurs within the GMUX Controller 335. For one embodiment, once both GPUs are rendering display streams, it is determined when the two display streams have an overlapping blanking interval 730 sufficient to migrate the display from the first display stream to the second display stream. During the overlapping blanking interval 740, the GMUX Select 730 signal is changed, e.g., from a logical zero to a logical one, to switch the display stream from the first GPU 205 to the second GPU 210. The GMUX output 750 reflects an output related to the first blanking interval 710 until the GMUX Select 730 switches the display streams. After the switch, the GMUX output 750 reflects an output related to the second blanking interval 720. For one embodiment, the GMUX Select 730 is sent to both the Data MUX 330 and Clock MUX 325 to switch separate data and clock streams.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. An apparatus comprising:

a graphics multiplexer (GMUX) to receive mirrored video display streams from a first graphics processing unit (GPU) and a second GPU, wherein the GMUX switches a video display stream sent to a display device from the video display stream from the first GPU to the video display stream from the second GPU, the switching occurring during a blanking interval for the first video display stream that overlaps with a blanking interval for the second video display stream, wherein the GMUX includes a GMUX controller to:

determine that the mirrored video display streams for the first GPU and the second GPU do not have an overlapping vertical blanking interval prior to the expiration of a selected vertical blanking interval for the first GPU;

cause the video display stream sent to a display device to be held in the selected vertical blanking interval of the first display stream for a length of time longer than the selected vertical blanking interval, wherein causing the video display stream to be held in the selected vertical blanking interval comprises decoupling an output of the GMUX from a next frame of an output of the first GPU; and determine, while the video display stream sent to a display device is being held within the selected vertical blanking interval, that the display stream for the second GPU has entered a vertical blanking interval.

2. The apparatus of claim 1, wherein the selected blanking interval is the first blanking interval for the first GPU once the second GPU has begun rendering the mirrored display data.

3. The apparatus of claim 1, wherein the GMUX controller is further to:

cause the raw video data feed to the first GPU to be terminated; and cause the power drawn by the first GPU to be reduced.

4. A non-transitory machine-readable medium storing instructions that, when executed, cause a machine to perform a method comprising:

receiving mirrored video display streams from both a first graphics processing unit (GPU) and a second GPU; and switching a video display stream sent to a display device from the mirrored video display stream from the first GPU to the mirrored video display stream from a second GPU, wherein the switching occurs during a blanking interval for the first GPU that overlaps with a blanking interval for the second GPU, wherein the switching occurs in response to determining that the mirrored video display streams for the first GPU and the second GPU do not have an overlapping vertical blanking interval prior to the expiration of a selected vertical blanking interval for the first GPU;

holding the video display stream sent to a display device in the selected vertical blanking interval of the first display stream for a length of time longer than the selected vertical blanking interval, wherein causing the video display stream to be held in the selected vertical blanking interval comprises decoupling an output of the GMUX from a next frame of an output of the first GPU; and determining, while the video display stream sent to a display device is being held within the selected vertical blanking interval, that the display stream for the second GPU has entered a vertical blanking interval.

5. The machine-readable medium of claim 4, wherein the selected blanking interval is the first blanking interval for the first GPU once the second GPU has begun rendering the mirrored display data.

6. The machine-readable medium of claim 4, further comprising:

terminating the raw video data feed to the first GPU; and reducing the power drawn by the first GPU.

* * * * *